Patented Aug. 23, 1927.

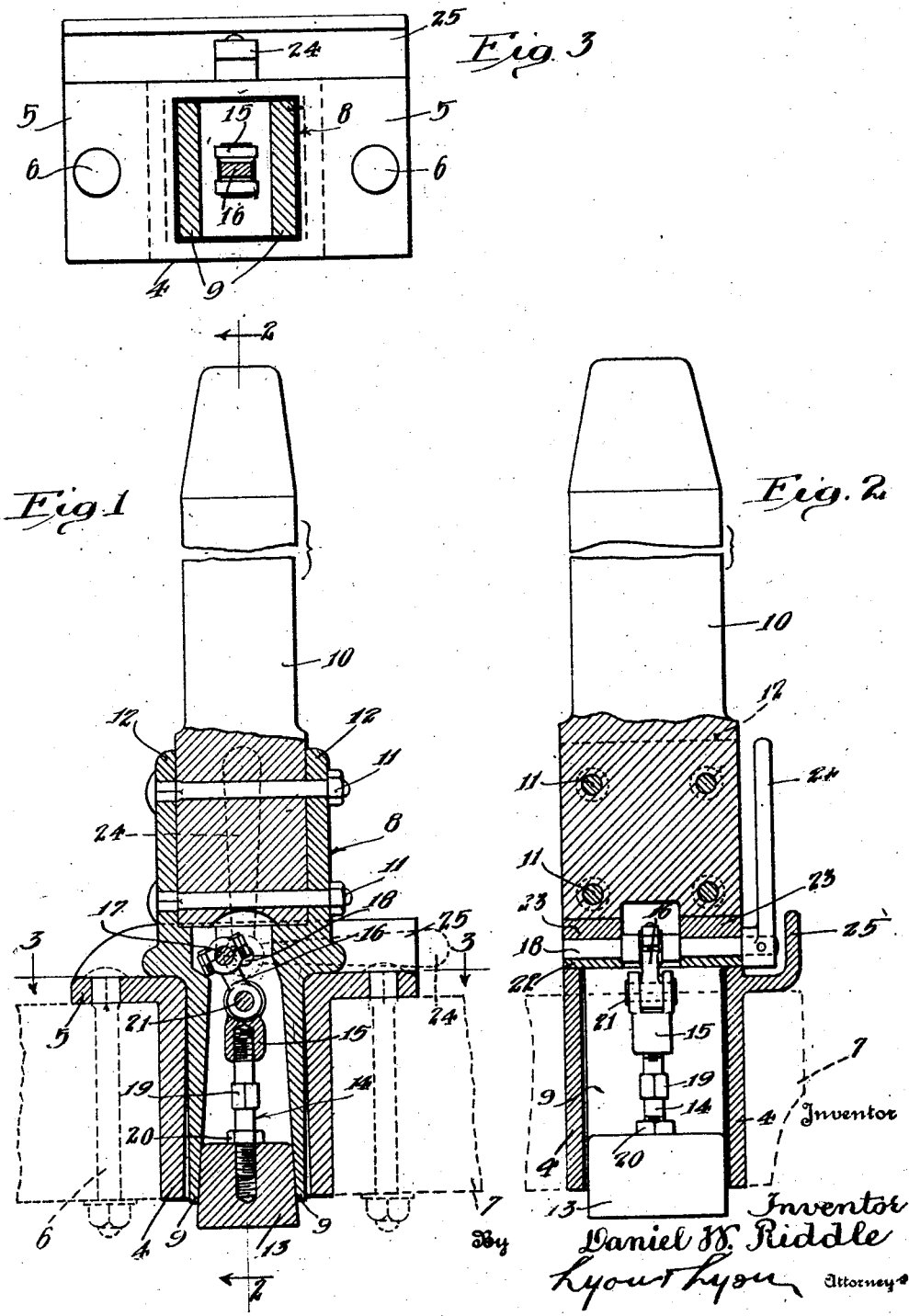

1,639,970

UNITED STATES PATENT OFFICE.

DANIEL W. RIDDLE, OF MAYWOOD, CALIFORNIA.

TRUCK STAKE AND MOUNTING THEREFOR.

Application filed July 25, 1925. Serial No. 46,109.

This invention relates to truck stakes and mountings therefor, and more especially to that type of truck stake and mounting having means to releasably hold the stake in place in the truck floor or platform.

An object of the invention is to produce a stake of this description that can be quickly removed and replaced and that, when in place, will be very secure so that it cannot be displaced by jolting of the truck.

Important features of the invention are the downwardly expanding socket and the expansible member within the socket capable of being expanded so that its lower end will be of larger diameter than the diameter of the upper end of the socket bore to make it impossible for said member to slip or be jolted out of the socket.

Another object is to provide a construction which will afford adjustment so as to compensate for wear between the moving parts.

Further objects and advantages will appear hereinafter.

The accompanying drawings illustrate the invention:

Fig. 1 is an elevation, mainly in vertical mid-section, of a truck stake and mounting therefor built in accordance with the provisions of this invention, a portion of the stake standard being broken away to contract the view. A truck platform and the bolts for securing the socket thereto are indicated in broken lines.

Fig. 2 is an elevation of the truck stake and mounting, partly in section on the line indicated by 2—2, Fig. 1.

Fig. 3 is a plan section on the line indicated by 3—3, Fig. 1.

There is provided a socket 4, preferably of metal and having an outwardly projecting flange 5 for receiving the bolts, indicated at 6, by which the socket is secured to the platform or floor of the truck, such platform or floor being indicated in broken lines in Figs. 1 and 2 at 7.

Adapted to be received within the bore of the socket 4 is an expansible member 8 comprising a bifurcated or split portion of which the furcations are indicated at 9. Normally the outer faces of the furcations 9 are substantially parallel and the distance between said faces, when the furcations 9 are normal, is slightly less than the width of the socket opening at the top thereof, thus readily admitting the insertion of the member 8 into the socket and withdrawal of said member from the socket.

The member 8 is of metal and, in this instance, the standard 10 of the stake is of separate construction, the material preferably being wood, and said standard is secured to the member 8 by bolts or other suitable fastening means 11. The bolts 11 pass through upstanding ears 12 of the member 8.

Between the furcations 9 is a means for locking the member 8 within the socket which is effected, in this instance, by spreading said furcations apart or wedgedly expanding the member 8 so as to make the lower end of the member 8 larger than the upper end of the socket bore. For this purpose, a wedge block 13 is provided and, preferably, upwardly and inwardly sloping sides of the block engage upwardly and inwardly sloping inner faces of the furcations 9.

To operate the wedge block 13, a rod 14 and coupling 15 connect the block with a link 16 which, in turn, has one end journaled on the crank 17 of a shaft 18. The rod 14 is adjustably connected with the wedge block 13 and coupling 15 and for this reason is, in this instance, threaded into said block and coupling, the screw threads at one end being right hand and those at the other end left hand. A wrench seat 19 on the rod enables a wrench to be applied to the rod to turn it when relative adjustment between the coupling and wedge block is desirable. A jamb nut 20 on the rod 14, when tightened against the wedge block 13, prevents relative turning between the rod and wedge block. The rod 14 is pivotally connected with a link 16, the pivot 21 extending through the coupling 15 and link 16. The shaft 18 is journaled in part in lower half bearings 22 and partly in upper half bearings 23. The upper half bearings 23 are held in place by any suitable means, in this instance by the lower end of the stake standard 10, and when said standard is disassembled, the half bearings 23 can be removed, thus enabling emplacement of the shaft 18, link 16 and coupling 15.

One end of the shaft 18 projects beyond one of the outer faces of the member 8 and on the projecting end is a handle 24 by which the shaft may be operated. When the handle 24 is in raised position, as shown in the drawings, the block 13 is retracted, and when the handle is swung to the right in Fig. 1, it elevates the block and wedges the furcations 9 outwardly. The relative positions of the handle 24 and crank 17 on the shaft are such that, when the handle 24 is substantially horizontal, in the dotted position indicated in Fig. 1, the axis of the crank 17 will be slightly to the right of a vertical line passing through the axis of rotation of the shaft 18 and the axis of the pivot 21, and the handle 24 will be held against further downward movement by reason of it engaging the bottom of an L-shaped lug or flange 25 of the member 8, said flange 25 protecting the handle 24 against injury when the handle is in position to effect wedging of the furcations 9 within the socket.

When it is desired to secure the stake, assuming that the parts are in the position as shown in Fig. 1, the handle 24 will be moved from the vertical position to the horizontal position, thus elevating the block 13 and expanding the member 8 in the socket. When it is desired to loosen the stake so that the same may be withdrawn, the handle will be thrown from the horizontal position to the vertical position, thus forcing the block 13 downwardly and permitting the furcations 9 to contract to normal position, the member 8 being constructed of a material having a more or less spring quality, at least sufficient to admit of the requisite slight expansions and automatic contractions.

I claim:—

A truck stake and mounting therefor comprising a socket member having a bore smaller at the upper end than at the lower end and provided with an outwardly extending flange adapted for securing to a truck body, a member having a split portion adapted to be inserted in the socket when said portion is contracted, a standard connected with the second mentioned member, a wedge block slidable in the split portion to expand the same, an operating member, a coupling inside of the split portion, means operable by movement of the operating member to shift the coupling lengthwise of the split portion, and means adjustably connecting the coupling and wedge block for adjustment of the wedge block along the split portion relative to the coupling.

Signed at Los Angeles, Calif., this 18 day of July, 1925.

DANIEL W. RIDDLE.